United States Patent [19]

Posner et al.

[11] 3,919,666

[45] Nov. 11, 1975

[54] SOLID STATE MICROWAVE CAVITY OSCILLATOR OPERATING BELOW CAVITY CUTOFF FREQUENCY

[75] Inventors: Ronald Sheldon Posner, Brookline; Richard Marion Walker, Chestnut Hill, both of Mass.

[73] Assignee: Microwave Associates, Inc., Burlington, Mass.

[22] Filed: Nov. 26, 1974

[21] Appl. No.: 527,255

[52] U.S. Cl. .......... 331/96; 331/107 R; 331/107 G; 331/177 V

[51] Int. Cl.$^2$ .......... H03B 7/14

[58] Field of Search .......... 331/96–99, 331/101, 107 R, 107 G, 177 V

[56] References Cited

UNITED STATES PATENTS

| | | | |
|---|---|---|---|
| 3,715,686 | 2/1973 | Perlman | 331/96 |
| 3,831,110 | 8/1974 | Eastman | 331/107 G |

OTHER PUBLICATIONS

Ivanek et al., Electronics Letters, May 15, 1969, Vol. 5, No. 10, pp. 214–216.

Wilson et al., IEEE Transactions on Electron Devices, July 1971, p. 450.

*Primary Examiner*—Siegfried H. Grimm
*Attorney, Agent, or Firm*—Alfred H. Rosen; Frank A. Steinhilper

[57] ABSTRACT

A microwave oscillator using a Gunn diode in a section of rectangular waveguide tuned to resonate as a cavity to a fundamental frequency that is below the waveguide cutoff frequency has its output for the fundamental frequency located at a place in the cavity at which a peak of the fundamental frequency wave and a null of the second harmonic coincide. Fundamental frequency output is taken in a direction transverse to the axis of the waveguide. Harmonic frequency energy can also be taken from the waveguide section, or suppressed, as desired.

18 Claims, 12 Drawing Figures

SOLID STATE MICROWAVE CAVITY OSCILLATOR OPERATING BELOW CAVITY CUTOFF FREQUENCY

BACKGROUND OF THE INVENTION

In the design of solid state local oscillators for certain radar systems operable in microwave-frequency ranges (e.g.: around 10 GHz), as exemplified by intrusion alarms and police radar systems, there are several technical requirements which the prior art has not satisfactorily met. A satisfactory oscillator ought to be capable of being swept in frequency continuously and approximately linearly between prescribed limits. The turn-on voltage should be small, or of low value. To compensate for frequency drift and pulling of the transmitter oscillator (e.g.: a magnetron) in radar systems, there is a requirement for about 60 mc. of AFC tuning of the receiver local oscillator.

In the available prior art oscillator devices it is usual to employ semiconductor diodes in microwave circuits or cavities, for example, a Gunn diode as the oscillator, and a varactor diode for AFC or FM frequency-shift purposes. Harmonics produced by the Gunn oscillator directly, and by the varactor due to frequency multiplication, cause both high turn-on voltage and discontinuous sweep characteristics.

It is known to use passbands below cut-off in waveguide structures for realization of microwave circuits using active devices. Ivanek, Shyam and Reddi report their experiments in an article entitled "Investigation of Waveguide-Below-Cutoff Resonator for Solid-State Active Devices", Electronics Letters, May 15, 1969, Vol. 5, No. 10, pages 214–216. The mode of operating a resonator at a fundamental frequency below cutoff has been termed "evanescentmode". Chilton and Kennedy report pulsed LSA operation in the evanescent $TE_{10}$ mode: "Multiple frequency operation associated with the LSA mode", Proc. IEEE, June 1968, No. 56, pages 1124/5. Craven describes "Waveguide Filters using Evanescent Modes" in Electronics Letters, July 1966, Vol. 2, No. 7, pages 251/2. Wilson and Minakovic describe a varactor tuned Gunn oscillator in which both doides are mounted between the broad sides of a short length of waveguide operated in an evanescent mode: "Development of an FM Pulsed Gunn Oscillator at X Band", IEEE Transactions on Electron Devices, July 1971, page 450.

The Federal Communications Commission regulations on harmonic output include requirements the effect of which is that, relative to the carrier, the harmonic output power of a local oscillator shall be less than −33 dBc for police radar and −45 dBc for intrusion alarms. Available prior art oscillators, such as those employing Gunn diodes as the oscillator device, have a harmonic content varying from −6 to −30 dBc. While an external filter might be added to reduce the harmonic output power from such oscillators, the increased size or cost of an oscillator-plus-filter combination has been found to be unacceptable to users.

The problems to which the present invention is addressed are, accordingly, to provide an electronic oscillator realized in solid-state components, employing a two-terminal oscillator such as a Gunn or other diode in a microwave circuit such as a resonant cavity, having the properties of:

1. low turn-on voltage;
2. continuous and approximately linear frequency sweep over a desired frequency range; and
3. reduced harmonic-frequency power output (e.g.: −50 dBc) without requiring an external filter.

As oscillator having these properties is useful in FM radar systems such as police radars, weather radars and intrusion alarm radars. An oscillator having only the third property is useful wherever there is a requirement to restrict haromonc output.

Among solid state electron discharge devices available for use in an oscillator according to the present invention are Gunn diodes, IMPATT diodes, LSA diodes, and others. Mention hereinafter of Gunn diodes is intended to be exemplary.

GENERAL NATURE OF THE INVENTION

Figure 1:
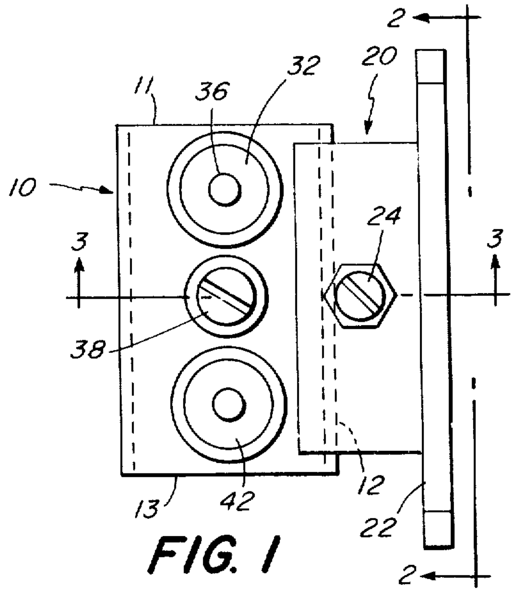
FIG. 1 is a top plan view of an oscillator according to the invention.
Figure 2:
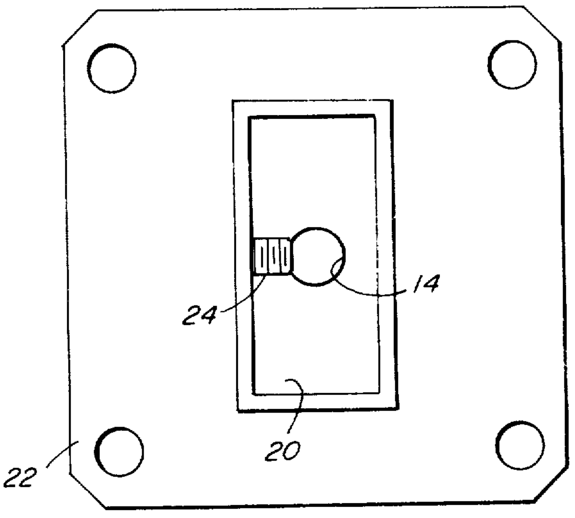
FIG. 2 is an end view on line 2—2 of FIG. 1.
Figure 3:
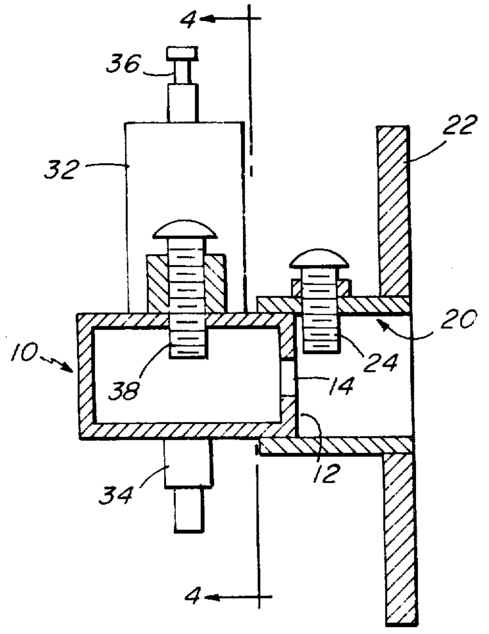
FIG. 3 is a section on line 3—3 of FIG. 1.

A portion of a section of transmission line, for example, rectangular waveguide, is tuned for resonance substantially as a half-wave cavity to electromagnetic wave energy oscillating at a fundamental frequency $f_0$ that is below the cut-off frequency $f_c$ for that transmission line. Energy is supplied by an electron discharge device coupled to a first region in the transmission line section. A tuning means in a second region of the line section, spaced a known distance away on the longitudinal axis of the line section from the first region, serves to tune the portion of the line section including both regions to cavity oscillation at the fundamental frequency. Energy at $f_0$ is extracted from the cavity portion of the oscillator line section at a location that is substantially at a peak of the fundamental wave, and preferably at a null of the second harmonic wave, for supplying fundamental frequency energy to a second transmission line that is dimensioned to propagate fundamental frequency energy. In a wave guide structure, a coupling means, such as an aperture in a side wall of the oscillator rectangular waveguide is provided, and the second transmission line, which may be another rectangular waveguide of larger transverse dimensions than the oscillator waveguide section, and having a cut-off frequency that is below the fundamental frequency $f_0$, is coupled as at an end, to the apertured side wall of the oscillator waveguide section. Electromagnetic wave energy at a harmonic frequency of $f_0$, of which the second harmonic is most prominent, can be treated entirely in the oscillator transmission line section, where it can be suppressed, or propagated separately from energy at the fundamental frequency, $f_0$. Thereby, a harmonic frequency generator can be made. Additionally, if the frequency of oscillation is to be controlled for AFC purposes, or swept as for use in radar systems, a voltage-controllable reactance device, such as a varactor diode, can be coupled to the cavity portion of the oscillator transmission line section. Harmonic frequency energy from such a diode can also be separately controlled and minimized.

DETAILED DESCRIPTION OF THE DRAWINGS

In FIGS. 1–4, inclusive, a first section of rectangular waveguide 10 is coupled at a narrow side 12 to a first end of a second section of larger rectangular waveguide 20 which is terminated at its other end in a coupling flange 22. The first section is shown open at its ends 11, 13, which can be left open as shown, or terminated in various ways, as will be discussed below with relation to FIGS. 5 to 9, inclusive. An aperture 14 in the narrow wall of the first section 10 serves to couple electromagnetic wave energy in a band of frequencies including a fundamental frequency $f_0$ out of the first waveguide section into the second waveguide section 20. The transition is tuned with a screw 24 located in the larger waveguide 20.

An electron discharge device 30 is held in a first region A of the first waveguide section 10 by mounting means comprising a choke housing 32 and heat sink 34 of a known form electrically coupling the device 30 across the waveguide section 10 in the first region. The electron discharge device is preferably an active device of solid state form, such as a semiconductor diode, having the property that when properly biased, via a bias terminal 36 in the choke housing 32, it will generate electromagnetic wave oscillations at the fundamental frequency $f_0$. Suitable active devices are Gunn diodes and Avalanche diodes, but these are only a few examples. The cut-off frequency $f_c$ of the first waveguide section 10 is well above the oscillator fundamental frequency $f_0$, and a capacitive tuning screw 38 located in a second region B of this waveguide is used to tune a portion 16 of the first waveguide section 10 to resonate as a half-wavelength long cavity that includes both regions A and B. The first waveguide section 10 thus operates at the fundamental frequency $f_0$ as a waveguide-below-cut-off resonator for the active device 30, in a manner that is generally described in the above-referenced article of Ivanek, Shyam and Reddi. The second waveguide section 20 has a cut-off frequency that is below the fundamental frequency $f_0$ so that fundamental frequency energy that is coupled out of the first waveguide section 10 can readily propagate in the second waveguide section.

As is illustrated in FIGS. 1–4, inclusive, the invention uses a voltage-variable reactance device, here shown as a voltage-variable-capacitance diode (varactor) 40 coupled across the first waveguide section 10 in a third region C by mounting means comprising a choke housing 42 and a heat sink 44 of known form, for controlling or shifting the fundamental frequency $f_0$ of the waveguide-below-cut-off resonator portion 16 of the first waveguide section 10 in response to a voltage applied to the bias terminal 46 in the choke housing 42. At the fundamental frequency the resonant cavity portion 16 of the first line section 10 is effectively terminated on one end by the electron discharge device 30 and on the opposite end by the voltage-variable reactance device 40, if electronic frequency modulation of the fundamental frequency $f_0$, or automatic frequency control (AFC) is desired. If F.M. or AFC is not desired, the end of the cavity 16 at region C can be terminated in a short-circuit, as is described below in connection with FIGS. 10 and 11. In either case, the cavity 16 is tuned to the fundamental frequency $f_0$ in its approximate center, at region B, by means of the tuning screw 38, which may be a rod of dielectric or electrically-conductive material. In the present invention as illustrated in FIGS. 1–4, inclusive, the AFC bandwidth is enhanced by placing the active device 30 and the frequency shift device 40 along the center line (not shown) of the waveguide axis of the first line section 10. The magnitude of AFC bandwidth can be controlled by adjusting the distance between the active device 30 and the frequency shift device 40. Locating the tuning means 38 between these two devices increases significantly the magnitude of the coupling of the frequency shift device 40 onto the active device 30, and in this manner AFC bandwidths of hundreds of MHz have been achieved, when operating the oscillator at X-band (e.g.: 9.4GHz).

The resonant cavity 16 realized in a waveguide operated below cut-off frequency is sometimes known as "evanescent" waveguide. As is noted above, for the fundamental frequency the cavity is bounded at its ends essentially between region A and region C. The electrical distance between those ends is substantially ½ wavelength, when loaded by the tuner 38, at fundamental frequency $f_0$, as is indicated at curve 47 in FIG. 4, and one full-wavelength at the second harmonic $2f_0$, as is indicated at curve 49. Since $f_c$ of the first line section 10 is above $f_0$, the fundamental frequency wave 47 will not propagate significantly beyond the end regions A and C. If, however, $f_c$ is below $2f_0$, the second harmonic wave will propagate beyond the cavity end regions in the first line section 10, unless measures are taken to terminate the line section for harmonic wave energy. Uniqueness of second harmonic tuning as herein described is assured by selecting $f_c$ such that $2f_0$ propagates in only one mode. As will be apparent, energy at any harmonic frequency higher than $f_c$ will propagate in the first line section 10 if no measure is taken to prevent it. Inasmuch as second harmonic frequency energy occurs at greater amplitude than higher-order harmonic frequency energy, the discussion herein is directed primarily to the treatment of second harmonic frequency energy.

The coupling aperture 14 in the narrow wall 12 is located in the same transverse plane at region B of the first line section 10 as is the tuning screw 38. A peak of the fundamental frequency wave 47 and a null of the second harmonic frequency wave 49 are both also located in this same transverse plane (see FIG. 4), thereby to present to the coupling aperture 14 a maximum of fundamental frequency voltage and a minimum of second harmonic frequency voltage. In this manner the output of fundamental frequency $f_0$ signal in the second waveguide 20 is made unusually free of second harmonic content, as much as 50 dB below the carrier $f_0$, (−50 dB), as compared with only 6 dB below the carrier in prior art oscillators.

Figure 4:
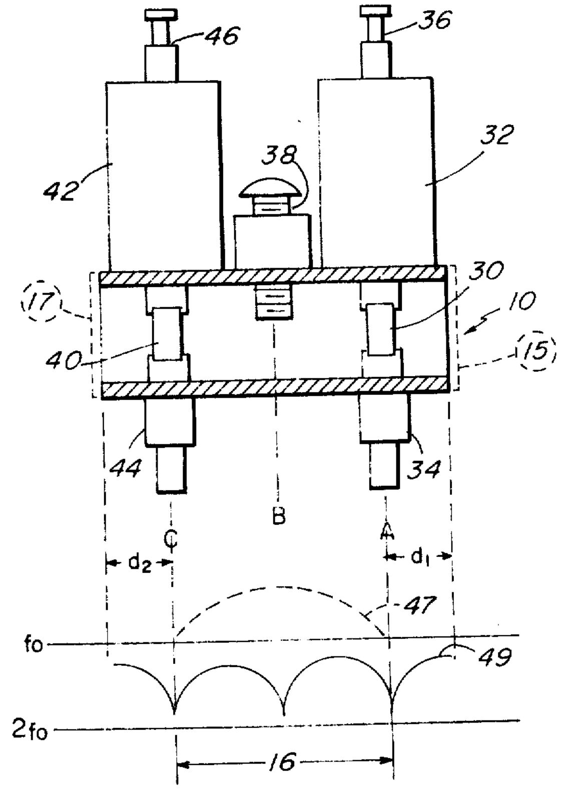
FIG. 4 is a section on line 4—4 of FIG. 3, with some graphic data added.

As is illustrated with dash-lines in FIG. 4, end plates 15 and 17 can be fitted to the first line section 10 at distances $d_1$ and $d_2$ respectively from region A and region C that are chosen to reduce the amplitude of the second harmonic frequency wave 49 in the cavity 16. An optimum electrical parameter to achieve this reduction for each of $d_1$ and $d_2$ is ½ wavelength in the waveguide 10 at the second harmonic frequency. Since the waveguide 10 beyond each of regions A and C is operated below cut-off at $f_0$, shorting plates in these positions have little effect on the fundamental resonant frequency of the cavity 16. Certain features of the oscillation at $f_0$ can be controlled by adjustment of harmonic shorting planes such as 15 and 17. These features include removing discontinuities from voltage sweep of the active device 30, providing reduced turn-on voltage of the oscillator, and providing improved sweep linearity for the frequency-shift device 40. In general, attention to harmonic termination of the first line 10 allows improved control of linearity of frequency sweep of the oscillator.

Figures 5, 6, 7, 8, 9, 10, 11:
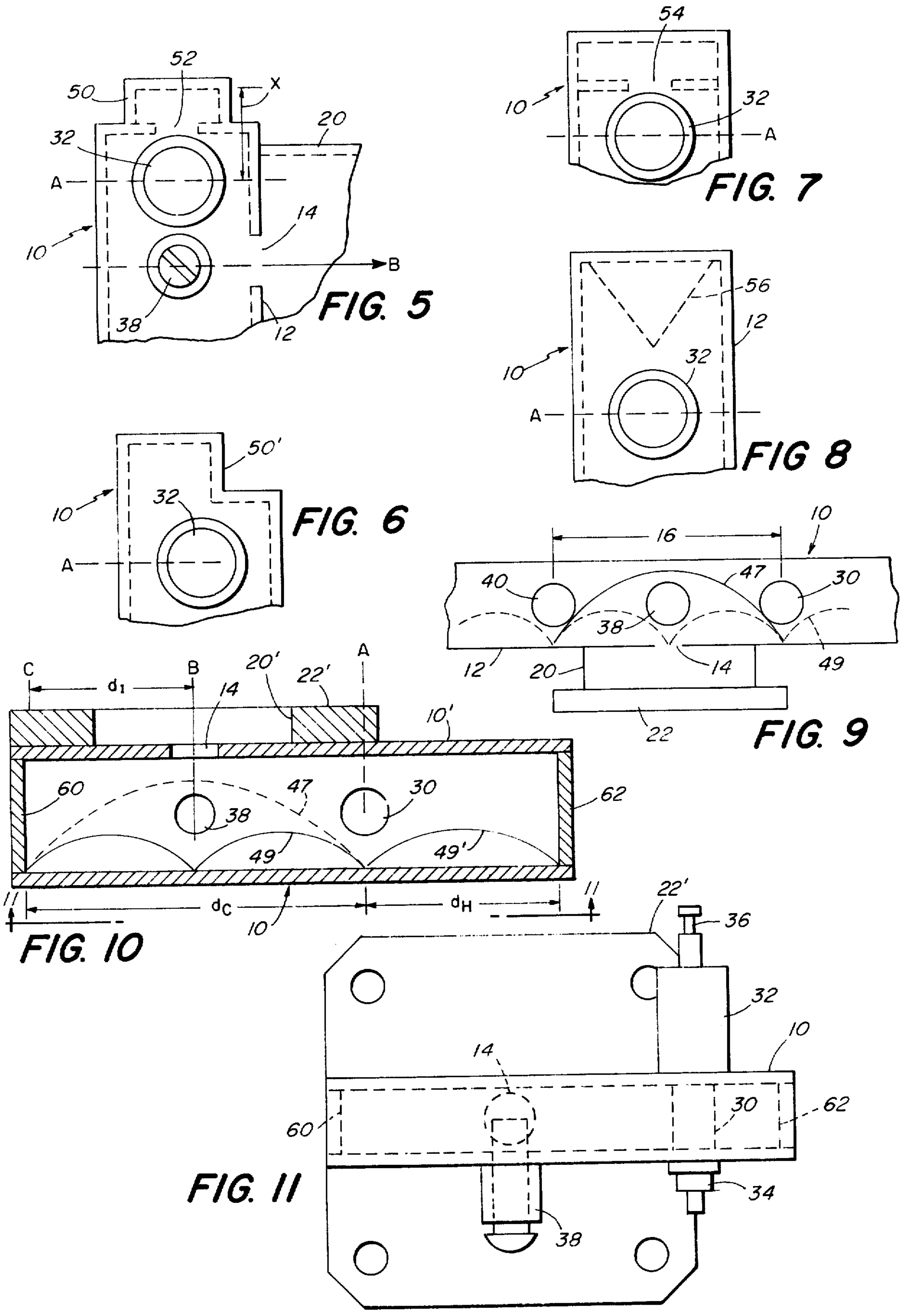
FIGS. 5 to 8, inclusive, are respective partial views of FIG. 1 modified for harmonic suppression.
FIG. 9 is a schematic illustration of the FIG. 1 embodiment of the invention showing a mode of using the invention.
FIG. 10 is a sectional view of an embodiment of the invention.
FIG. 11 is a side view of FIG. 10.

Independent tuning to eliminate higher order harmonics can be added as shown in FIGS. 5 and 6. In FIG. 5 a secondary stub line 50 is added to the first line 10 which will propagate a selected higher harmonic only, and the stub length X is adjusted to provide a short circuit across the active device 30, at that particular harmonic frequency. This auxiliary stub line 50 may be coupled to the main line 10 by a resonant iris 52 or by an opening the size of the stub line (see FIG. 6). Independent tuning can be applied to the active device 30 or to the frequency shift device 40. FIG. 6 shows a similar stub 50' displaced off the longitudinal axis of the first line 10. Such harmonic stubs (not shown) can also be added to the cavity 16 opposite the coupling hole 14 to decouple the output waveguide 20 for the particular harmonic frequency selected.

FIG. 7 indicates a resonant iris 54 for a particular harmonic frequency. FIG. 8 changes the harmonic termination from purely reactive to a resistive termination 56 for loading down the harmonics, without selection among the various harmonics that may be present.

A special feature of the below-cut-off oscillator approach of the present invention is that the fundamental frequency resonant circuit 16 may be incorporated in an open structure as shown in FIG. 9. A liquid or gas for cooling purposes, for example, could be pumped through the first waveguide 10 without changing the electrical characteristics of the oscillator structure.

FIGS. 10 and 11 illustrate an embodiment of the invention, mentioned above, not having F.M. or AFC capability, in which region C of the first transmission line section 10 is terminated in a short circuit, by a plate 60. Components that are common with the embodiment of FIGS. 1–4 bear the same reference characters. The second waveguide 20 and coupling flange 22 of FIGS. 1–4 find their equivalent in FIGS. 10 and 11 in the flange 22' having a waveguide passage 20' through it. The transition tuning screw 24 of FIGS. 1–4 is not present in FIGS. 10 and 11.

The distance $d_c$ in FIG. 10 is equivalent to the distance 16 in FIG. 14. It is the length of the fundamental frequency resonant cavity between regions A and C; its electrical length is ½ wavelength 47 in the line 10 of energy at $f_0$, and one complete wavelength 49 in the line of energy at $2f_0$. An extension 10' of the first line 10 a distance $d_H$ beyond the active device 30 is a second harmonic termination. Due to the evanescent nature of the fundamental RF field existing in the extension 10' (i.e.: the fundamental mode is cut off) this extension is effectively external to the fundamental frequency cavity, as has been noted above. For that reason, a short circuit plate 62 located across the extension 10' the distance $d_H$ from the active device 30 can little affect the resonant field pattern of the fundamental frequency oscillation mode. A distance $d_H$ can be found experimentally at which second harmonic ($2f_0$) power output from the coupling aperture 14 is essentially zero. Likewise, a distance $d_H$ can be found at which third harmonic ($3f_0$) power output from the coupling aperture is essentially zero. In FIG. 10 the distance $d_H$ is shown located at the first $2f_0$ null position, ½ wavelength at $2f_0$ away from the active device 30. In general, the harmonic output power of a particular harmonic frequency can be made to approach or equal zero wherever the harmonic load, as viewed by the active device 30, is a short circuit at that frequency. Such a short circuit can be placed across the active device for a particular harmonic frequency, whenever the distance $d_H$ is a multiple of ½ the harmonic-frequency wavelength.

When the first line section 10 is terminated in a short circuit for $2f_0$, the second harmonic energy is reflected away from the plate 62, forming the standing wave pattern 49, 49'. Advantage is taken of this fact to locate the coupling aperture 14 in the region B where the aperture dipole moments are essentially zero for the harmonic frequency $2f_0$. This augments the harmonic-suppressing effect of the $2f_0$ short circuit plate 62.

The length $d_c$ of the fundamental frequency resonant cavity is also chosen to place an electrical short circuit across the active device 30 at a harmonic frequency, this distance corresponding to a multiple of half-wavelengths in the first line 10 at the harmonic frequency, of which the first half-wavelength is taken up by the distance $d_l$ between the first shorting plate 60 and the tuning means 38. The distance $d_c$ is optimally slightly greater than one guide wavelength in the first line 10 at $2f_0$. This dimension will place an electrical short circuit across the active device 30 at $2f_0$.

In review of the immediately-foregoing discussion, it is seen that several dimensions of the transmission line section 10 which embodies the fundamental frequency cavity can be selected to both minimize the amplitude of second harmonic frequency energy in the cavity and minimize the presence of that energy at the coupling 14 to the output, while maximizing the presence of fundamental frequency energy at the coupling 14 to the output, and these results are facilitated in a line section 10 which is dimensioned to operate at a fundamental frequency that is below its cut-off frequency.

Figure 12:
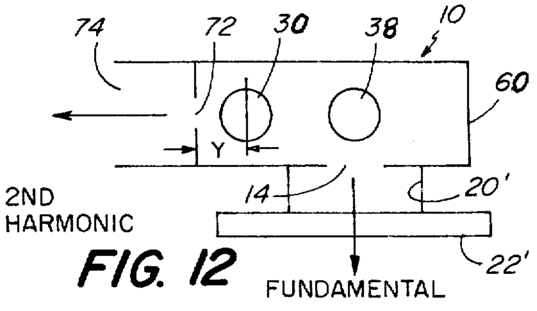
FIG. 12 is a schematic illustration of a modified version of the FIG. 10 embodiment of the invention.

The open structure nature of the $f_0$ resonator circuit is also a high pass filter which allows the harmonics to propagate in the first line 10. This principle may be used to make a multiplier circuit with or without the use of a multiplier diode. The harmonic output is then extracted at an end of the first transmission line 10 as shown in FIG. 12, which is a modification of the embodiment of FIGS. 10 and 11 in which the end plate 62 confronting the active device 30 is removed, and an iris 72 at a distance Y from the active device is installed to facilitate coupling second harmonic frequency energy out via the open end 74 of the first transmission line. The amplitude of second harmonic frequency energy in the output of the first transmission line section 10 can be increased by moving the iris 72 relative to the active device 30, while at the same time maintaining the desired isolation between $f_0$ and $2f_0$ at the fundamental frequency output aperture 14 into the output line 20'. This technique is useful in making a frequency doubler without the use of a multiplier diode.

In practical embodiments of the invention according to FIGS. 1–4, inclusive, using both an oscillator cavity realized in a transverse first line operated below cut-off at $f_0$, and including harmonic supressor stubs as in any of FIGS. 5 to 8, inclusive, the advantages of independent control of the harmonic output, low turn-on voltage and continuous sweep were realized. Compared to prior art devices, an oscillator according to FIGS. 1–4, (with end plates 15 and 17 fitted as shown in FIG. 4), operating at 9400 mc/sec, using a varactor of 1 to 2 pf, and a voltage swing of 0–13 volts, produced greater than 63 mc of AFC, as compared with only 20 to 30 mc. of AFC in the prior art devices.

In general, the invention is best operative when a peak of the fundamental frequency wave and a null of the second harmonic frequency wave are presented simultaneously to the fundamental frequency output. This condition is optimized by the techniques disclosed herein. An oscillator that operates acceptably for some applications may be achieved if attention is confined to providing that the electrical distance from the output coupling 14 to the active device 30 at $nf_0$ is ½ guide wavelength, while assuring also that the cavity remains ½ wavelength long at the fundamental frequency.

We claim:

1. An electronic oscillator for providing electromagnetic wave energy at microwave frequencies, comprising a section of transmission line having a longitudinal axis, an electron discharge device which is capable of generating such energy in a range of frequencies including a fundamental frequency $f_0$ which is below the cut-off frequency of said transmission line, and a harmonic frequency of $f_0$ which propagates in a single mode in said transmission line, means coupling said device to a first region in said transmission line section, tuning means in a second region of the transmission line section spaced a known distance along said axis from said first region for tuning a portion of said section including said first and second regions to resonate substantially as a half-wave cavity to said fundamental frequency $f_0$, means selected from one or both of (a) means to suppress generation of said harmonic frequency and (b) means to establish in said line a standing wave of said harmonic frequency having a null in the vicinity of a peak of the fundamental frequency wave, and output means to extract energy at said fundamental frequency $f_0$ from said portion of said transmission line section, for supplying said fundamental frequency energy substantially free of said harmonic energy to a receiver therefor.

2. An oscillator according to claim 1 wherein said cavity resonates also as a cavity $n$ half-wavelengths long to the second harmonic $2f_0$, where $n$ is an integer greater than 1.

3. An oscillator according to claim 1 including means to extract from said transmission line electromagnetic wave energy at a frequency above said cut-off frequency which is a harmonic of said fundamental frequency.

4. An oscillator according to claim 1 including means located in a third region of the transmission line on the opposite side of said second region from said first region, for establishing effectively a short circuit at said harmonic frequency, the distance between said third region and said output means being an integral number of half-waves in said line at said harmonic frequency.

5. An oscillator according to claim 1 including harmonic load means coupled to said transmission line section on the opposite side of said electron discharge device and spaced from said discharge device axially with respect to said tuning means for receiving and suppressing harmonic frequency energy outside of said cavity portion of said transmission line which resonates to said fundamental frequency.

6. An oscillator according to claim 5 in which said harmonic load means is a short circuit across said transmission line section spaced axially from said discharge device substantially an integral number of half-wavelengths in said section of said harmonic frequency energy.

7. An oscillator according to claim 5 in which said harmonic load means includes an energy absorber.

8. An oscillator according to claim 5 in which said harmonic load means includes a stub-line and means coupling said stub-line to said transmission line section.

9. An oscillator according to claim 1 including a short circuit across said transmission line located axially in a third region on the side opposite said tuning means relative to said electron discharge device, the effective electrical first distance from said short circuit to said electron discharge device being at least two half-wavelengths in said transmission line of said second harmonic frequency energy, and the effective electrical second distance from said short circuit to said tuning means being an integral number of said half-wavelengths which is at least one of said half-wavelengths less than said first-distance.

10. An oscillator according to claim 9 including means coupled to said transmission line section on the opposite side of said electron discharge device and spaced from said discharge device axially with respect to said tuning means for suppressing second harmonic frequency energy outside of said cavity portion of said transmission line which resonates to said fundamental frequency.

11. An oscillator according to claim 1 including voltage-variable reactance frequency-shift means, and means for coupling said frequency shift means to said transmission line in a third region located axially on the side opposite said tuning means relative to said discharge means.

12. An oscillator according to claim 11 including means coupled to said transmission line section outside said fundamental frequency half-wave cavity portion for suppressing harmonic frequency energy propagating away from said cavity portion in said transmission line section.

13. An oscillator according to claim 1 in which said transmission line is a section of rectangular waveguide, and said means to extract energy is located in a narrow sidewall of said waveguide.

14. An oscillator according to claim 13 including a second rectangular waveguide having a cut-off frequency lower than $f_0$ oriented with its longitudinal axis perpendicular to said longitudinal axis of said oscillator section and coupled at an end to said oscillator section at said sidewall via said means to extract energy.

15. An electronic oscillator for providing electromagnetic wave energy at microwave frequencies, comprising a section of transmission line having a longitudinal axis, an electron discharge device which is capable of generating such energy in a range of frequencies including a fundamental frequency $f_0$ which is below the cut-off frequency $f_c$ of said transmission line, and a harmonic frequency $nf_0$ of $f_0$ which propagates in a single mode in said transmission line, means coupling said device to a first region in said transmission line section, tuning means in a second region of the transmission line section spaced a known distance along said axis from said first region for tuning a portion of said section including said first and second regions to resonate substantially as a half-wave cavity to said fundamental frequency $f_0$, and means to extract from said transmission line section energy at said harmonic frequency.

16. An oscillator according to claim 15 including means coupled to said transmission line to enhance the amplitude of energy at said harmonic frequency.

17. An oscillator according to claim 15 in which said transmission line is a section of rectangular waveguide having a cut-off frequency such that $nf_0>f_c>f_0$, and said means to extract energy is located at one end of said waveguide section.

18. An oscillator according to claim 1 including a second transmission line having a cut-off frequency below said fundamental frequency coupled to said portion via said means to extract energy.

* * * * *

UNITED STATES PATENT OFFICE
CERTIFICATE OF CORRECTION

Patent No. 3,919,666 Dated November 11, 1975

Inventor(s) Ronald Sheldon Posner; Richard Marion Walker

It is certified that error appears in the above-identified patent and that said Letters Patent are hereby corrected as shown below:

Column 2, line 5, change "As" to --An--

Column 5, line 56, change "FIG. 14" to --FIG. 4--

Column 8, line 13, after "said" (second occurrence) insert --second--

Signed and Sealed this

*eighteenth* Day of *May 1976*

[SEAL]

*Attest:*

RUTH C. MASON
*Attesting Officer*

C. MARSHALL DANN
*Commissioner of Patents and Trademarks*